US010031936B2

(12) United States Patent
Bitar et al.

(10) Patent No.: US 10,031,936 B2
(45) Date of Patent: Jul. 24, 2018

(54) DATABASE TABLE DATA FABRICATION

(71) Applicant: International Business Machines Corporation, Armonk, NY (US)

(72) Inventors: Akram Bitar, Kfar Peqiin (IL); Oleg Blinder, Haifa (IL); Ronen Levy, Haifa (IL); Tamer Salman, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 14/881,187

(22) Filed: Oct. 13, 2015

(65) Prior Publication Data

US 2017/0103099 A1 Apr. 13, 2017

(51) Int. Cl.
*G06F 17/30* (2006.01)
(52) U.S. Cl.
CPC .. *G06F 17/30371* (2013.01); *G06F 17/30339* (2013.01)
(58) Field of Classification Search
None
See application file for complete search history.

(56) References Cited

U.S. PATENT DOCUMENTS

| 8,996,915 B2 | 3/2015 | Clifford et al. |
| 2010/0005077 A1* | 1/2010 | Krishnamurthy . G06F 17/30463 707/E17.136 |
| 2010/0299364 A1* | 11/2010 | Baldwin ............... G06F 17/279 707/797 |
| 2012/0197867 A1 | 8/2012 | Copty |
| 2013/0124576 A1* | 5/2013 | Adir .................... G06F 11/3684 707/803 |
| 2013/0311830 A1 | 11/2013 | Wei |
| 2014/0006459 A1 | 1/2014 | Guo et al. |
| 2014/0143198 A1 | 5/2014 | Snow et al. |

OTHER PUBLICATIONS

Kai Pan et al., "Automatic test generation for mutation testing on database applications", Automation of Software Test (AST), 2013 8th International Workshop on IEEE, May 18-19, 2013 ,pp. 111-117.

Alton Adir et al., "Dynamic Test Data Generation for Data Intensive Applications",Hardware and Software: Verification and Testing, vol. 7261 of the series Lecture Notes in Computer Science pp. 219-233 can be found at: URL: http://link.springer.com/chapter/10.1007%2F978-3-642-34188-5_19.

* cited by examiner

*Primary Examiner* — Wilson Lee
(74) *Attorney, Agent, or Firm* — Daniel Kligler

(57) ABSTRACT

Methods, computing systems and computer program products implement embodiments of the present invention that include receiving a request to fabricate, for a database including multiple tables, a respective target number of data records for each of the tables, and receiving one or more intra-database rules for the multiple tables. Examples of the intra-database rules include cross-record rules and cross-table rules. Upon identifying one or more referential integrity constraints for the multiple tables, the respective target number of data records for each of the multiple tables are fabricated in response to the request. In embodiments of the present invention, the fabricated data records comply with the one or more referential integrity constraints and the one or more intra-database rules.

14 Claims, 2 Drawing Sheets

10,031,936 B2

DATABASE TABLE DATA FABRICATION

FIELD OF THE INVENTION

The present invention relates generally to software testing, and specifically to fabricating, for multiple database tables, data that complies with referential integrity constraints and intra-database rules comprising cross-record and cross-table rules.

BACKGROUND

Computer systems can use rules for fabricating test data. The rules describe requirements the fabricated data should satisfy. These rules can be defined by a testing engineer or gained automatically from the involved environments. Rules used for fabricating test typically originate sources such as (a) Data-logic (e.g., referential integrity), (b) Application-logic (e.g., relations between different attributes dictated by the application), and (c) Test-logic (e.g., rules dictated by the test person to produce data that exercises specific test scenario).

The description above is presented as a general overview of related art in this field and should not be construed as an admission that any of the information it contains constitutes prior art against the present patent application.

SUMMARY

There is provided, in accordance with an embodiment of the present invention a method, including receiving, by a processor, a request to fabricate, for a database including multiple tables, a respective target number of data records for each of the tables, receiving one or more intra-database rules for the multiple tables, identifying one or more referential integrity constraints for the multiple tables, and fabricating, in response to the request, the respective target number of data records for each of the multiple tables, the fabricated data records complying with the one or more referential integrity constraints and the one or more intra-database rules.

There is also provided, in accordance with an embodiment of the present invention an apparatus, including a storage device configured to store multiple tables in a database, and a processor configured to receive a request to fabricate a respective target number of data records for each of the tables, to receive one or more intra-database rules for the multiple tables, to identify one or more referential integrity constraints for the multiple tables, and to fabricate, in response to the request, the respective target number of data records for each of the multiple tables, the fabricated data records complying with the one or more referential integrity constraints and the one or more intra-database rules.

There is further provided, in accordance with an embodiment of the present invention a computer program product, the computer program product including a non-transitory computer readable storage medium having computer readable program code embodied therewith, the computer readable program code including computer readable program code configured to receive a request to fabricate, for a database including multiple tables, a respective target number of data records for each of the tables, computer readable program code configured to receive one or more intra-database rules for the multiple tables, computer readable program code configured to identify one or more referential integrity constraints for the multiple tables, and to fabricate, in response to the request, the respective target number of data records for each of the multiple tables, the fabricated data records complying with the one or more referential integrity constraints and the one or more intra-database rules.

BRIEF DESCRIPTION OF THE DRAWINGS

The disclosure is herein described, by way of example only, with reference to the accompanying drawings, wherein.

DETAILED DESCRIPTION OF EMBODIMENTS

Figure 1:
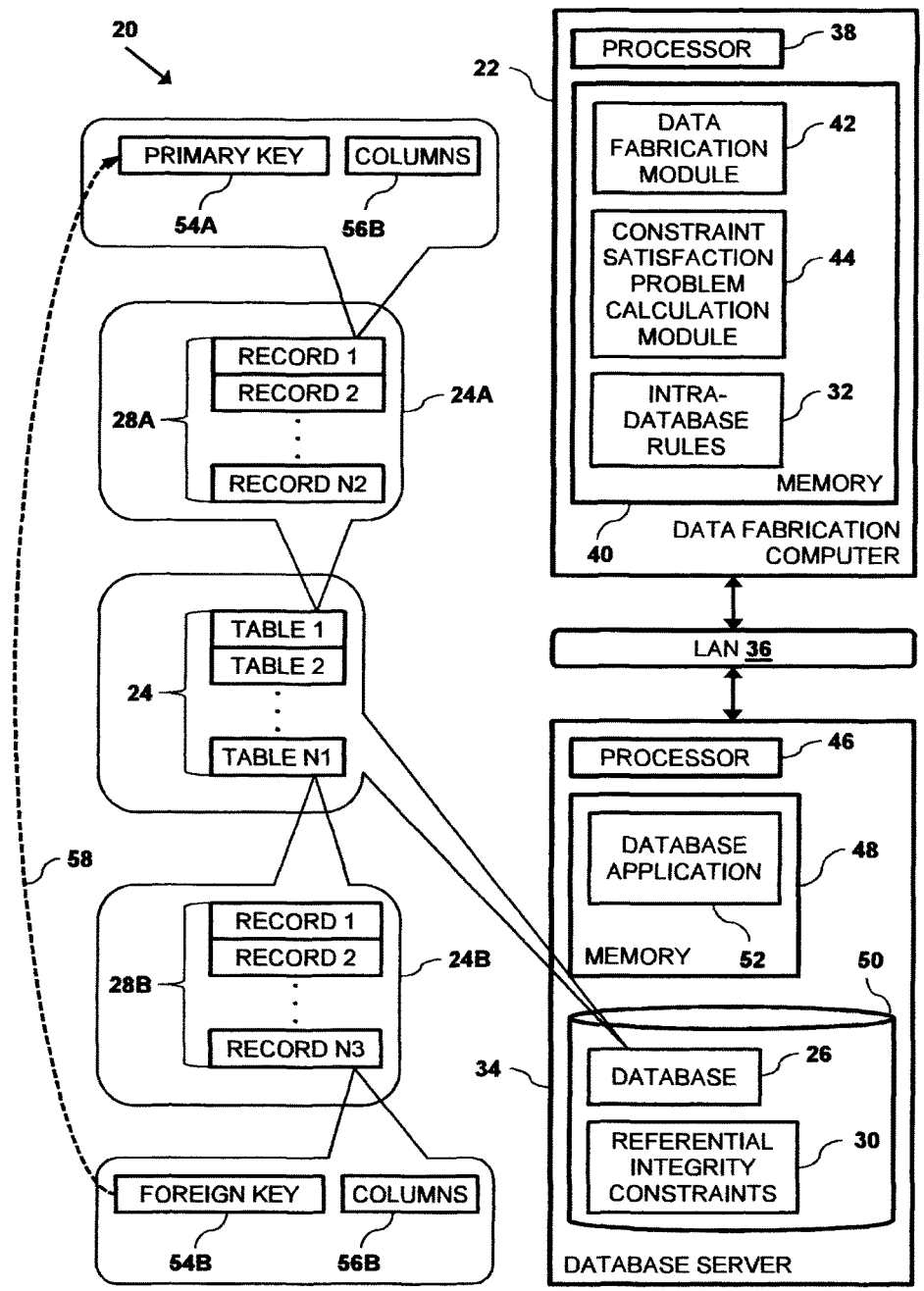
FIG. 1 is a block diagram that schematically illustrates a computing facility comprising a computer system configured to fabricate data for multiple database tables, in accordance with an embodiment of the present invention.

Embodiments of the present invention provide methods and systems for fabricating test data for tables in a database. As described hereinbelow, a request is received to fabricate, for a database system comprising multiple tables, a respective target number of data records for each of the tables, the request also comprising one or more intra-database rules for the multiple tables. In response to the request, one or more referential integrity constraints are identified for the multiple tables, and the respective target number of data records for each of the multiple tables can be fabricated. In embodiments of the present invention, the fabricated data records comply with both the one or more referential integrity constraints and the one or more intra-database rules.

In some embodiments, the required number of records can be fabricated for each table by generating and inserting records into tables in a rotation manner. The rotation can fulfill the data needs of the most "starving" (i.e., the least complete) table first, and can adhere to the referential integrity constraints existing among the tables. In order to improve date randomness, the rotation algorithm can randomly choose the table among equally "starving" tables, as described hereinbelow.

In additional embodiments, the data can be fabricated iteratively by fabricating one data record at a time, and committing (i.e., inserting) each of the fabricated data records into a given table before proceeding to the next data record. When fabricating the data records iteratively in the presence of referential integrity and intra-database constraints, a "wide" record (spread across several inter-dependent tables) can be fabricated in each of the iterations. Additionally or alternatively, when complying with intra-database (e.g., intra-table) constraints or when supporting complex table topologies, several records of the same table can be fabricated during a single iteration.

In further embodiments, a "random data sampling and reuse" strategy can be implemented in order to achieve many-to-one and many-to-many inter-table record dependencies with adequate (random) distribution of intra-database dependencies. For example, if a table T2 has a foreign key to a table T1's primary key or if an intra-database constraint exists among these two tables, a newly generated record in T2 can reference a given record that is randomly chosen (i.e., existing) record in T1.

While embodiments described herein describe fabricating database records that comply with referential integrity constraints, fabricating any type of structured data stored in files or object stores is considered to be within the spirit and scope of the present invention. Embodiments described herein can fabricate structured data having no referential integrity constraints and insert the data directly into files or objects, and more complicated data files can be fabricated through adaptors, abstracting files and objects and exposing them through database-like application program interfaces (APIs). Alternatively, data can be fabricated into intermediate database tables and then exported to data files or objects.

By implementing embodiments of the present invention, data fabrication systems can be flexible in terms of rule-table topologies, and scalable in terms of the required number of records. This flexibility enables fabricating records that are compliant with complex intra-database rules and table topologies, while the scalability capability enables the generation of large numbers of compliant records.

System Description

FIG. 1 is a block diagram that schematically illustrates a facility 20 comprising a data fabrication computer 22 (that is configured to fabricate, for tables 24 in a database 26, data records 28 that comply with referential integrity constraints 30 and intra-database rules 32. In FIG. 1, tables 24 are differentiated by appending a letter to the identifying numeral, so that the tables comprise tables 24A and 24B. Facility 20 also comprises a database server 34 that stores database 26 and communicates with computer 22 via a local area network (LAN) 36.

Computer 22 comprises a fabrication processor 38 and a fabrication memory 40 that stores a data fabrication module 42, a constraint satisfaction problem calculation module 44 and intra-database rules 32. In the configuration shown in FIG. 1, processor 38 executes data fabrication module 42 that uses constraint satisfaction problem calculation module 44 to fabricate records 28 that comply with intra-database rules 32 and referential integrity constraints 30. The functionality of constraint satisfaction problem calculation module 44 is described in detail hereinbelow.

Database server 34 comprises a database processor 46, a database memory 48 and a storage device 50 that stores database and referential integrity constraints 30. Examples of storage device 50 include, but are not limited to hard disk drives and solid state disks. In operation, processor 46 executes, from memory 48, a database application 52 that manages database comprising multiple tables 24, each of the tables comprising multiple records 28. Each record 28 comprises one or more keys 54 and columns 56 that store data.

In the configuration shown in FIG. 1, database 26 comprises a parent table 24A and a child table 24B. In parent table 24A, each key 54A comprises a unique primary key value, and in child table 24A, key 54B in each record 28B comprises a foreign key value that references a given record 28A, as indicated by an arrow 58.

As described supra, data fabrication module 42 can generate records 28 that comply with referential integrity constraints 30 and intra-database rules 32. Referential integrity constraints are typically stored within metadata for database 26, and processor 38 can receive intra-database rules 32 as input from a user (not shown). An example of a given referential integrity constraint 30 for database 26 may comprise denying permission to delete a given record 28A if there are any records 28B whose foreign key 54B references the given record (i.e., denying permission to delete a parent record that has active child records).

Examples of intra-database rules 32 include, but are not limited to cross-table rules, cross-record rules and test-scenario related rules. Cross-table rules comprise data validation rules for data in a first given column 56 in a first given table 24 based on data in second given column 57 in a second given table 24. For example, a given cross-table rule 32 may comprise that data stored in a given column 56B matches data stored a given column 56A. Likewise, cross-record rules comprise data validation rules for data stored for data in a first given record 28 in a given table 24 based on data in second record 28 in the (i.e., the same) given table.

While the configuration in FIG. 1 shows data fabrication module 42 fabricating records 28 for database 26 that has a simple two table hierarchical topology having two levels, fabricating records 28 other types of database topologies with any number of levels is considered to be within the spirit and scope of the present invention. Examples of other topologies for database 26 include, but are not limited to, circle topologies and diamond topologies.

Additionally or alternatively, while database 26 in FIG. 1 has a 1:1 cardinality between tables 24A and 24B, fabricating records 28 for tables 24 that have other cardinalities (e.g., 1:many and many:many) is considered to be within the spirit and scope of the present invention. In one embodiment, a given table 24 may comprise multiple foreign keys 54, in which case, the given table 24 comprises a child table having a corresponding multiple of tables 24 configured as parent tables of the given table.

Processors 38 and 46 typically comprise a general-purpose computer, which are programmed in software to carry out the functions described herein. The software may be downloaded to computer 22 and database server 34 in electronic form, over a network, for example, or it may be provided on non-transitory tangible media, such as optical, magnetic or electronic memory media. Alternatively, some or all of the functions of processors 38 and 46 may be carried out by dedicated or programmable digital hardware components, or using a combination of hardware and software elements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Live Test Data Fabrication

Figure 2:
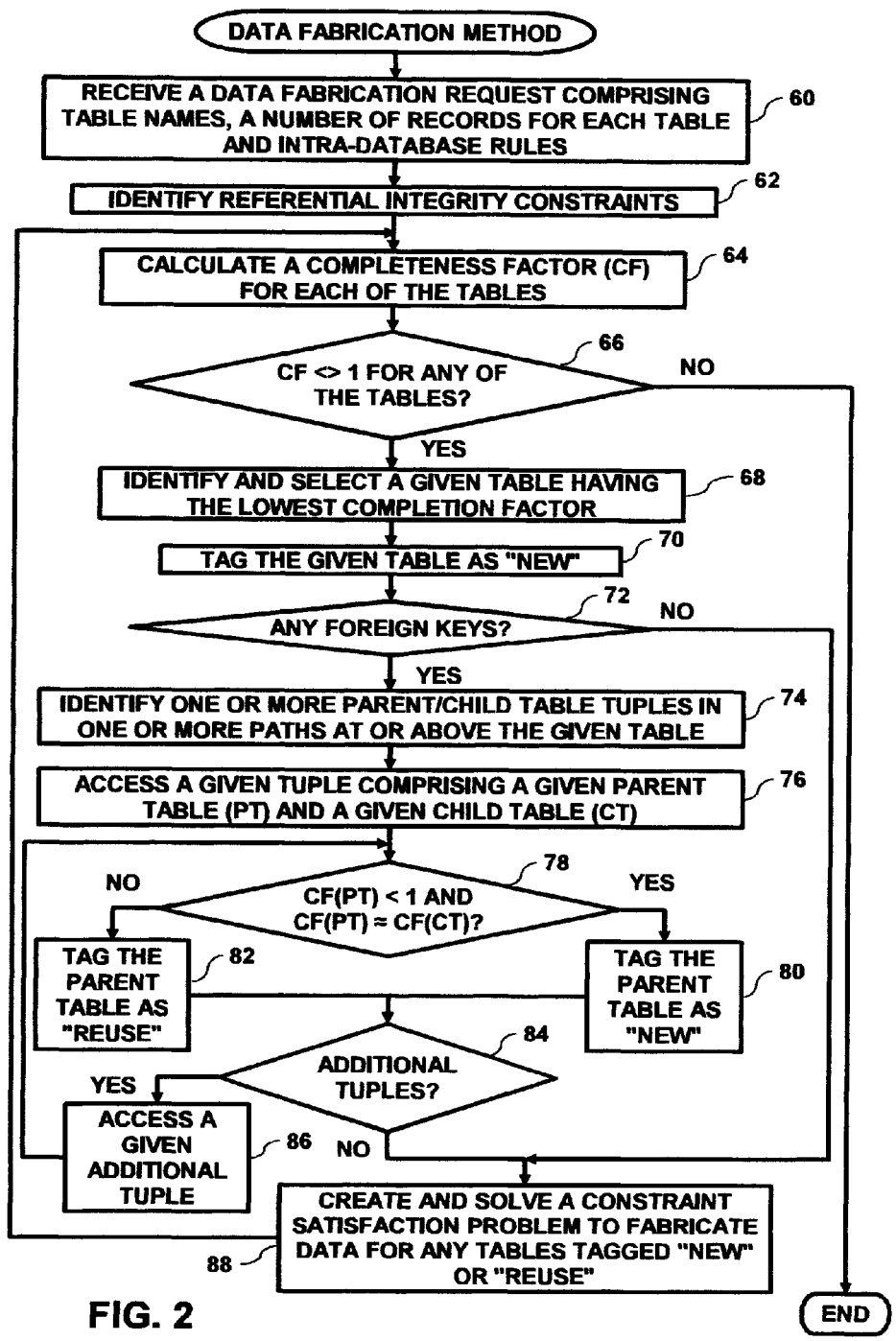
FIG. 2 is a flow diagram that schematically illustrates a method of fabricating the data for the multiple database tables, in accordance with an embodiment of the present invention.

FIG. 2 is a flow diagram that schematically illustrates a method for fabricating records 28 that comply with one or more referential integrity constraints 30 and one or more intra-database rules 32, in accordance with an embodiment of the present invention. In a receive step 60, data fabrication module 42 receives a data fabrication request comprising names of tables 24, a target number of data records 28 for each of the tables (i.e., in the request) and one or more intra-database rules 32.

In a first identification step 62, data fabrication module 42 identifies referential integrity constraints 30 for the tables in the request. As described supra, data fabrication module 42 can identify the referential integrity constraints by retrieving the referential integrity constraints from metadata stored with database 26 on storage device 50.

In a calculation step 64, data fabrication module 42 determines a current count of the data records in each of the tables, calculates a completeness factor for each of the tables. Since the completeness factor for a given table 24 is (number of fabricated records)/(number of target records), the completeness factor for each of the tables starts out as zero.

In a first comparison step 66, if the completion factor is not equal to one for any of the tables, data fabrication module 42 identifies and selects a given table 24 that has the lowest completion factor in a selection step 68, and tags the given table as "NEW" in a first tagging step 70. In situations where multiple tables 24 have identical lowest completion factors, data fabrication module 42 can randomly select one of the tables having the lowest completion factor.

In a second comparison step 72, if the given table comprises any key 54 configured as a foreign key, then in a second identification step 74, data fabrication module 42 identifies one or more parent table/child table tuples in database 26 that are at or above (i.e., at the same level in the hierarchy of the tables) the given table. In the example shown in FIG. 1, the tuple comprises table 24A (i.e., the "parent table") and table 24B (i.e., the "child table"). As described supra, there may be multiple levels "above" the given table and the given table may have multiple keys 54 configured as foreign keys. Therefore there may be a plurality of parent/child table tuples at or above the given table.

In an access step 76, data fabrication module 42 accesses a given tuple comprising a given parent table 24 and a given child table 24. In a third comparison step 78, if the completion factor for the given parent table is less than one and the completion factor of the given parent table is in accordance (i.e., equal to or within a predefined range) with the given child table, then data fabrication module 42 tags the given parent table as "NEW" (also referred to herein as a first tag value) in a second tag step 80. However, if the condition in step 78 is not met, then data fabrication module 42 tags the given parent table as "REUSE" (also referred to herein as a second tag value) in a third tag step 82.

In a fourth comparison step 84, if there are any additional parent table/child table tuples, then in a second access step 86, data fabrication module 42 accesses an additional tuple, and the method continues with step 78. If there are no additional tuples, then in an execution step 88, data fabrication module 42 creates a constraint satisfaction problem (CSP), uses constraint satisfaction problem calculation module 44 to solve the (CSP) in order to fabricate data for the tagged records, and the method continues with step 64. In embodiments described herein, the constraint satisfaction problem fabricates data in response to the request by generating one or more new (i.e., additional) records 28 for any of the tables tagged "NEW", and fabricating data by using existing data for any of the tables tagged "REUSE", as described hereinbelow.

Returning to step 72, if there are no foreign keys in the given table, then the method continues with step 86. Returning to step 66, if the completion factor equals one for all the tables, then the data fabrication process is complete, and the method ends.

In some embodiments, steps 74-86 can be performed recursively (in a similar manner to recursively traversing a tree data structure) by tagging the one or more parent tables of the given node, and then accessing the one or more parent tables of the given node, and repeating the process until reaching the highest level table (i.e., the root table) of the database.

In the flow diagram shown in FIG. 2, steps 64-86 comprise a single data fabrication iteration. In embodiments of the present invention, constraint satisfaction problem calculation module 44 can fabricate data for database 26 by calculating a CSP that performs the following for each tagged tabled 24:

For each column 56, define a variable and add the variable to the CSP.
For each table 24 tagged with "REUSE":
 Fetch a random sample of unique k records 28 that are already stored in table 24.
 For each of the k records define a value-tuple CSP constraint and add it to the CSP.
For each referential integrity constraint 30, define a Foreign Key=Primary Key CSP constraint and add it to the CSP.

For any data check constraints declared at database 26 define an appropriate CSP value constraint and add it to the CSP.

For each user rule 32, an appropriate CSP constraint is defined and added to the CSP, and CSP calculation module 44 can then solve the CSP in order to determine variable values for the appropriate data columns 56. Upon solving the CSP, data fabrication module 42 writes (i.e., inserts) any newly generated data record(s) 28 into the appropriate database table(s) 24, following referential integrity dependencies (i.e., from a given parent table 24 to a given child table 24), and for each table 24 tagged with "NEW", update the existing records number and recalculate the completeness factor. Finally, if at least one starving (uncompleted) table 24 exists (i.e., in step 66), proceed to the next fabrication iteration (i.e., starting with step 68).

In some embodiments, the choice of the sample size k retrieved from a given table can affect the possibility of solution. If the fetched records 28 are all existing records in the table, the possibility of succeeding in any tables 24 tagged as "REUSE" is maximized. However, this may be harmful to performance. For smaller values of k, there is a larger possibility of failing when fabricating data for the tables marked with "REUSE".

Failing to fabricated data for a given table 24 marked with "REUSE" can be solved in different ways. First, if k is not the maximal possible value (i.e., all existing records), then a number of retries to fetch different records can be performed. Additionally, the number k can be increased with the retry to increase the possibility of success. Furthermore, the number of retries cam be limited, and of no success is reached, the "REUSE" tag can be changed to a "NEW" tag (i.e., for a given table.

In some embodiments, when refining the fabrication algorithm, it is possible to minimize the number of CSP variables in order to simplify an iteration of the CSP and improve the solving performance. Additionally, CSP variables can be defined only for columns 56 in the tables marked with "REUSE", for which either referential integrity constraints 30 or intra-database rules 32 are defined. Other columns 56 in tables 24 marked with "REUSE" can be safely omitted.

In additional embodiments when fabricating data in a presence of intra-table cross-record constraints, there might be cases when a user wants to specify additional rules 32 constraining values of different records 28 of the same table 24. In these cases, several sets of column variables (a variable set per record) can be defined and solved during the same iteration CSP. Note that all the relevant constraints (referential integrity constraints 30, check constraints and user rule constrains 32) should be duplicated for each variable set in these cases.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method of generating test data for a database, comprising:
   receiving, by a processor, a request to fabricate, for a database comprising multiple tables, a respective target number of data records for each of the tables;
   receiving one or more intra-database rules for the multiple tables;
   identifying one or more referential integrity constraints for the multiple tables; and
   fabricating, in response to the request, the respective target number of data records for each of the multiple tables, the fabricated data records complying with the one or more referential integrity constraints and the one or more intra-database rules,
   wherein fabricating the data records comprises repeatedly performing:
      determining a current count of data records in each of the tables,
      calculating, for each of the data tables, a completeness factor based on their respective current and target counts, and
      upon the completeness factor of at least one of the tables indicating the multiple data tables not comprising their respective target number of data records:
         selecting a given data table having the lowest completion factor,
         identifying parent tables from the multiple tables, that are connected in a path of foreign key to primary key paths to the selected given data table;
         tagging the given data table with a first tag value;
         tagging each of the identified parent tables with either the first tag value or a second tag value, responsive to a relation between the completeness factors of the parent tables and of corresponding child tables;
         creating a constraint satisfaction problem for the tagged tables;
         solving the constraint satisfaction problem in a manner which generates a new record for the tables tagged with the first tag value and uses existing records of tables tagged with the second tag value; and
         writing the generated new records into the corresponding tables.

2. The method according to claim 1, wherein each of the intra-database rules is selected from a group consisting of a cross-table rule and a cross-record rule.

3. The method according to claim 1, wherein the tables in the database comprise multiple cardinalities, and wherein the database comprises multiple topologies.

4. The method according to claim 1, wherein tagging each of the identified parent tables comprises tagging an identified parent table with the first tag value upon detecting that the respective completeness factor of the identified parent table is equal to or within a predefined range of a respective completeness factor of a child table of the identified parent table.

5. The method according to claim 4, and comprising tagging the identified parent table with the second tag value upon determining that the respective completeness factor for the identified parent table indicates the identified parent table comprising its respective target number of data records or upon detecting that the respective completeness factor of the identified parent table is not in accordance with the respective completeness factor of the child table of the identified parent table.

6. An apparatus for generating test data for a database, comprising:
   a storage device configured to store multiple tables in a database; and
   a processor configured:
      to receive a request to fabricate a respective target number of data records for each of the tables,
      to receive one or more intra-database rules for the multiple tables,
      to identify one or more referential integrity constraints for the multiple tables, and
      to fabricate, in response to the request, the respective target number of data records for each of the multiple tables, the fabricated data records complying with the one or more referential integrity constraints and the one or more intra-database rules,
   wherein fabricating the data records comprises repeatedly performing:
      determining a current count of data records in each of the tables,
      calculating, for each of the data tables, a completeness factor based on their respective current and target counts, and
      upon the completeness factor of at least one of the tables indicating the multiple data tables not comprising their respective target number of data records:
         selecting a given data table having the lowest completion factor,
         identifying parent tables from the multiple tables, that are connected in a path of foreign key to primary key paths to the selected given data table;
         tagging the given data table with a first tag value;
         tagging each of the identified parent tables with either the first tag value or a second tag value, responsive to a relation between the completeness factors of the parent tables and of corresponding child tables;
         creating a constraint satisfaction problem for the tagged tables;
         solving the constraint satisfaction problem in a manner which generates a new record for the tables tagged with the first tag value and uses existing records of tables tagged with the second tag value; and
         writing the generated new records into the corresponding tables.

7. The apparatus according to claim 6, wherein each of the intra-database rules is selected from a group consisting of a cross-table rule and a cross-record rule.

8. The apparatus according to claim 6, wherein the tables in the database comprise multiple cardinalities, and wherein the database comprises multiple topologies.

9. The apparatus according to claim 6, wherein the processor is configured in tagging each of the identified parent tables to tag an identified parent table with the first tag value upon detecting that the respective completeness factor of the identified parent table is equal to or within a predefined range of a respective completeness factor of a child table of the identified parent table.

10. The apparatus according to claim 9, wherein the processor is configured to tag the identified parent table with the second tag value upon determining that the respective completeness factor for the identified parent table indicates the identified parent table comprising its respective target number of data records or upon detecting that the respective completeness factor of the identified parent table is not in accordance with the respective completeness factor of the child table of the identified parent table.

11. A computer program product, the computer program product comprising:
- a non-transitory computer readable storage medium having computer readable program code embodied therewith, the computer readable program code comprising:
- computer readable program code configured to receive a request to fabricate, for a database comprising multiple tables, a respective target number of data records for each of the tables;
- computer readable program code configured to receive one or more intra-database rules for the multiple tables;
- computer readable program code configured to identify one or more referential integrity constraints for the multiple tables; and
- computer readable program code configured to fabricate, in response to the request, the respective target number of data records for each of the multiple tables, the fabricated data records complying with the one or more referential integrity constraints and the one or more intra-database rules,
- wherein fabricating the data records comprises repeatedly performing:
  - determining a current count of data records in each of the tables,
  - calculating, for each of the data tables, a completeness factor based on their respective current and target counts, and
  - upon the completeness factor of at least one of the tables indicating the multiple data tables not comprising their respective target number of data records:
    - selecting a given data table having the lowest completion factor,
    - identifying parent tables from the multiple tables, that are connected in a path of foreign key to primary key paths to the selected given data table;
    - tagging the given data table with a first tag value;
    - tagging each of the identified parent tables with either the first tag value or a second tag value, responsive to a relation between the completeness factors of the parent tables and of corresponding child tables;
    - creating a constraint satisfaction problem for the tagged tables;
    - solving the constraint satisfaction problem in a manner which generates a new record for the tables tagged with the first tag value and uses existing records of tables tagged with the second tag value; and
  - writing the generated new records into the corresponding tables.

12. The computer program product according to claim 11, wherein each of the intra-database rules is selected from a group consisting of a cross-table rule and a cross-record rule.

13. The computer program product according to claim 11, and comprising computer readable program code configured to tag an identified parent table with the first tag value upon detecting that the respective completeness factor of the identified parent table is equal to or within a predefined range of a respective completeness factor of a child table of the identified parent table.

14. The method according to claim 1, wherein creating the constraint satisfaction problem for the tagged tables comprises for each table tagged with the second tag value, fetching a random sample of unique k records from the table and defining for each of the k records, a value-tuple CSP constraint.

* * * * *